A. Weeks,
Wood Auger,
Nº 18,003. Patented Aug. 11, 1857.

UNITED STATES PATENT OFFICE.

ASA WEEKS, OF SOUTH BOSTON, MASSACHUSETTS, ASSIGNOR TO HIMSELF AND ORIN W. FISKE.

EXPANDING AUGER-BIT.

Specification of Letters Patent No. 18,003, dated August 11, 1857.

*To all whom it may concern:*

Be it known that I, ASA WEEKS, of South Boston, in the county of Suffolk and State of Massachusetts, have invented an Improved Expanding Bit or Auger; and I do hereby declare that the same is fully described and represented in the following specification and the accompanying drawings, of which—

Figure 1:
Figure 2:
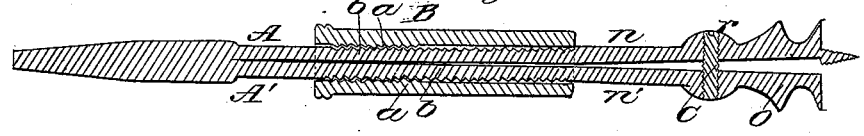

Figure 1 exhibits a side view, and Fig. 2 a longitudinal section of the said auger or bit.

The said instrument is constructed like a common screw auger with the exception that it has a split shank and body as shown at A, A′, there being placed upon said shank a tubular sleeve B, so as to surround and turn freely upon it. This sleeve has a female screw, $a$, cut in one end of it and so as to receive and turn upon a male screw, $b$, formed on the shank, A, in the position as shown in the drawings. The two portions $n$, $n′$, of the shank and body are to be formed of spring steel and they are to be made with a slight taper from the body, A′, to the key part, $o$, in order that when the sleeve is screwed toward the body, A′, the two parts of the shank may be compressed so as to cause them to approach one another. There is also a screw C, extended through the two parts A, of the shank, such screw being formed with threads running in opposite directions from one another from its middle toward its ends; one of said threads being what is usually termed a right screw thread, while the other is of that description commonly called a left screw thread.

Figure 3:

Fig. 3, shows a side view of the said screw. The two parts of it turn in corresponding female screws formed respectively on the prongs or two parts of the shank. Therefore, when the double screw C, is turned in one direction, it will expand the bit or force the two parts of its shank and body asunder. So when it is turned in an opposite direction, it will contract the bit. Although by moving the double headed screw, the two parts of the shank can be expanded were no sleeve used. Yet the double screw is used in connection with the sleeve and its screws in order to prevent the two parts of the shank from closing together or approaching one another during the operation of boring with the tool. It may be thought that a screw with a single thread screwed through one of the prongs of the shank and against the other prong would suffice to prevent the parts of such shank from collapsing while the instrument may be in use, but it should be borne in mind that the double screw enables the parts to be moved asunder twice the distance of a single screw and therefore it has an advantage over the single screw. Besides this, it has other advantages.

When the auger is in use, the sleeve counteracts the tendency of the lateral strain on the parts of the shank, to break or bend the double threaded screw. Were it not for the sleeve, the effect of the torsion strain would be so serious as soon to damage the double screw. The mutual advantage of the double screw and sleeve will be apparent. Before expanding the bit the screw should be turned back sufficiently to allow the double screw to be revolved far enough. So also after the double screw has been turned so as to contract the bit, the sleeve should be turned up so as to bear closely against the prongs of the shank.

One end of the screw is grooved transversely, as seen at $r$, the same being for the purpose of allowing a screw driver to be employed in turning the double screw. In proportion as we open apart the shank of the auger, the larger will be the hole which the auger will bore when put in use, and of course the nearer we bring together the two parts of the shank the less will be the diameter of the hole which the auger will make.

I do not claim the invention of movable cutters: nor do I claim the employment of a double threaded screw for adjusting the distance of a lip and cutter, as shown in the patent granted to J. P. Rollins December 25th 1855; but—

What I do claim as my invention, is,

Combining with the double threaded screw C, and arranging on the split tapering shank as described, a rotary sleeve and its screws, arranged as described.

In testimony whereof, I have hereunto set my signature this twenty second day of July A. D. 1856.

ASA WEEKS.

Witnesses:
G. V. PICKERING,
LYMAN B. WALKER.